Dec. 31, 1963     M. J. G. TIPPER     3,115,733
CASING PRESSURE PACKER AND SEALER
Filed April 26, 1962     2 Sheets-Sheet 1
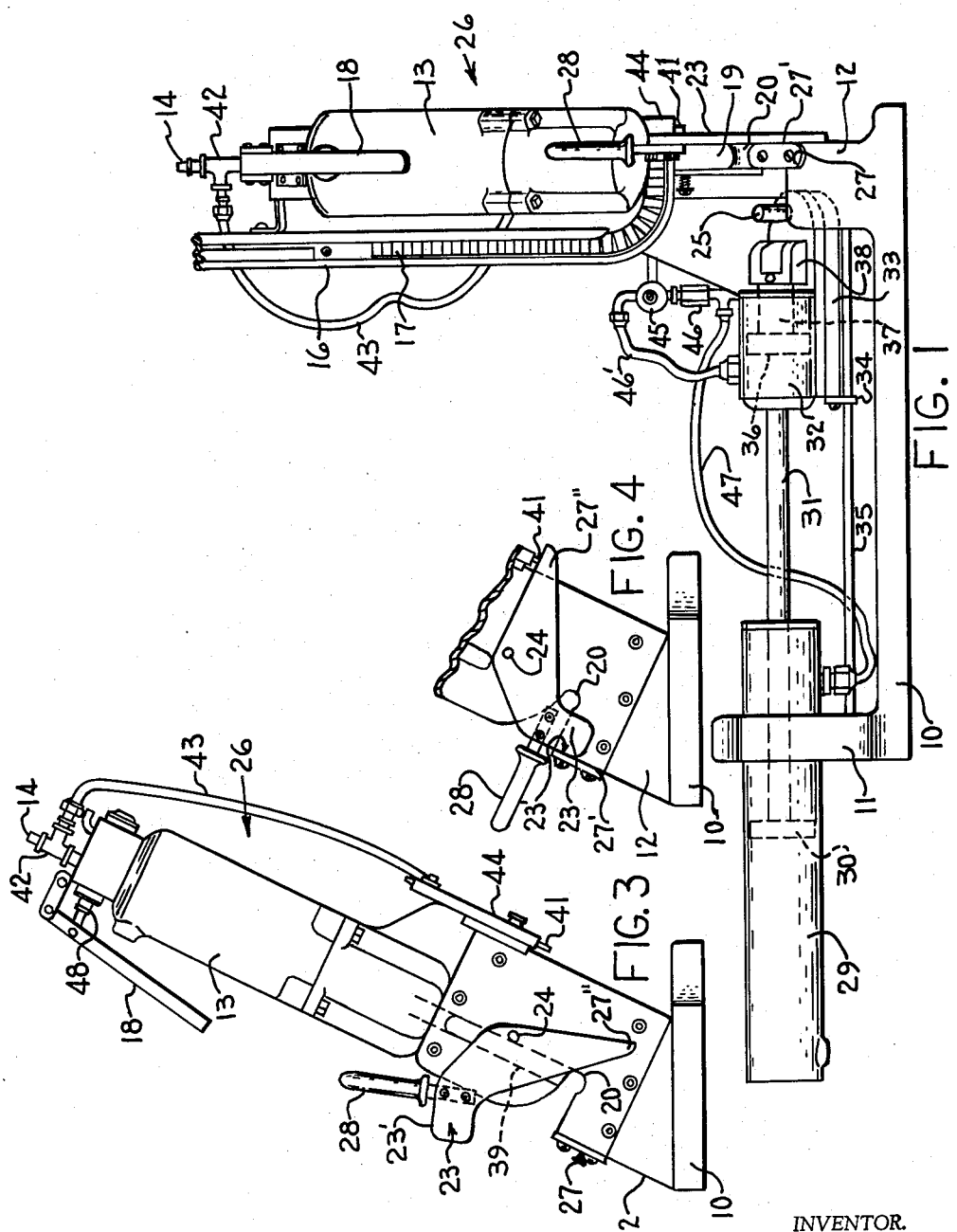
INVENTOR.
MAYNARD J. G. TIPPER
BY
ATTORNEY

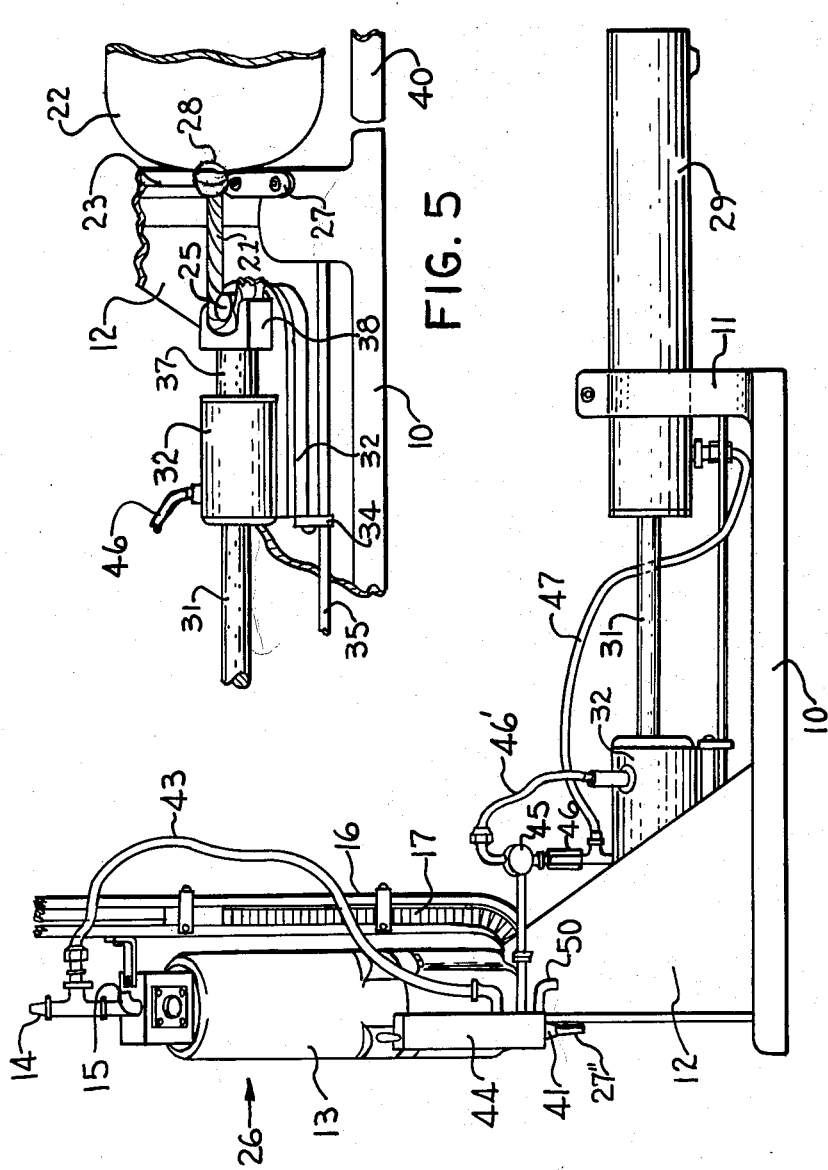

United States Patent Office 3,115,733
Patented Dec. 31, 1963

3,115,733
CASING PRESSURE PACKER AND SEALER
Maynard J. G. Tipper, 2501 Humbolt Drive,
San Leandro, Calif.
Filed Apr. 26, 1962, Ser. No. 190,330
4 Claims. (Cl. 53—124)

This invention relates to a casing pressure packer and sealer for fast packing and sealing into casings of ham, turkey, chicken rolls, and the like. More specifically, it deals with a device designed to grip the end of a casing and pull it through a clamped sealer opening until the casing contents are tightly packed therein, and then to seal the casing end to produce a solidly packed and sealed product.

Various casing sealing machines have been described in the art. For example, the Tipper casing stapler, described in United States Patent 2,880,419 is a commercial casing sealing machine now on the market, and it will be employed herein as an example of a sealing machine applicable to the present invention, although the invention is not limited thereto. However, such a machine will not pack the contents of a casing, and, to that extent, the sealing machine is limited as to usage.

According to the present invention, it is now possible to adapt a sealing machine to a pulling unit of the present invention, provided modifications are made on the gate closure of the sealing machine, and in other ways, as will be outlined herein.

The present invention will be more readily understood by reference to the accompanying drawings, in which a preferred embodiment is described, and in which FIGURE 1 depicts a front view of a preferred machine in idle position. FIGURE 2 illustrates a rear view of the same machine, while FIGURE 3 is a motor end elevational view of the machine, with gate open. A similar view of the lower motor end portion of the same machine, with gate closed, is depicted in FIGURE 4. FIGURE 5 presents a front view of the pulling portion of the same machine, after it has pulled the casing end and sealed it with a staple and prior to release. Similar numerals refer to similar parts in the various figures.

Referring again to the drawings, numeral 10 represents a base having an upright end 11, and a rearwardly-tilted end 12. Mounted on tilted support 12 is conventional air (pneumatic) motor 13 having air inlet connection 14, and air discharge 15. Magazine 16 contains a series of metal staples 17 which are fed under the vertically-reciprocable plunger of the motor. When valve handle 18 is pressed down, the motor plunger (not shown) pushes a staple down channel 39 (FIG. 3) in housing 19 (FIG. 1), so that the staple straddles throat 20, into which has been inserted the end 21 of casing 22 to be sealed. A spring-loaded gate 23, mounted on the side (or end) of the machine, is flexibly pivoted at 24, and it serves to close off the throat 20 after the casing end 21 has been fastened to post 25 of the pulling mechanism. In essence, the sealing (stapling) machine, designated generally as 26, is similar to that described in the aforesaid Patent 2,880,419. However, there is a difference in that the lower front plate 27 of the machine has a sidewise projecting portion or edge 27' disposed so that when gate 23 is lowered by handle 28 into closed position, the forward edge 23' of the gate (which has a resilient pivot 24) engages behind edge 27' of plate 27 and becomes temporarily locked in position, thereby freeing the hand to press lever 18 for the stapling operation. Gate 23 may be readily disengaged by moving it outwardly so that its spring (not shown) will pull it up to the open position.

Mounted on upright end 11 of base 10 is pneumatic pressure cylinder 29, in which rides spring-loaded piston 30, to which is attached piston rod 31. The outside end of rod 31 is attached to cylinder 32.

Another pneumatic pressure cylinder 32 is mounted on carriage 33, having a projecting guide 34 which rides along over guide rod 35, the latter being supported, in parallel relation to rod 31, by the ends of base 10. Inside cylinder 32 is spring-loaded piston 36 attached to piston rod 37, the outer end of which is attached to clamping jaw 38. When rod 37 is pushed out by air pressure (acting on piston 36), jaw 38 is designed to clamp against post 25, which also is mounted on carriage 33.

When in use, a casing 22, filled with ham turkey, or the like, and having a twisted end 21, is laid on platform 40 (FIG. 5), and the twisted casing end is inserted into open throat 20 of the stapler, and then is twisted around post 25. Thereafter, gate 23 is lowered by means of handle 28 and locked against edge 27' of plate 27. When this locking takes place, rear end 27" of gate 23 pushes switch button 41, which permits compressed air to pass from T 42, through hose 43 and valve 44 (opened by switch 41), through control valve 45 and hose 46', and into cylinder 32, where it pushes out piston 37 and causes jaws 38 to hold the casing end tightly against post 25. Switch 41 also causes compressed air to pass (more slowly, due to control orifice 46) through hose 47, and into cylinder 29 where piston 30 is pulled outwardly, pulling (via rod 31), carriage 33, which carries cylinder 36 and post 25. This pulling action causes the casing end 21 to be stretched through opening 20 (FIG. 4) formed by gate 23 and throat 20. The stretching causes a packing of the contents in casing 22 to the desired pressure. Thereafter, the operator presses down lever 18 which causes air valve 48 of motor 13 to be opened, which action forces the spring-loaded piston and connected rod (not shown) to push a staple down channel 39, around casing end 21 at throat 20, and crimp the staple therearound. After this has taken place, the operator raises gate 23 by handle 28, which action closes switch 41 and releases pressure out of cylinder 29 and 32, and through discharge 50, returning the piston rods 31 and 37 to idle position, as in FIG. 1.

I claim:
1. A casing pressure packer and sealer used in combination with a casing sealing machine designed to drive a fastener over a throat through which a casing end is drawn, said throat having an end closure gate, comprising,
   a base designed to carry a casing sealing machine on one end, said machine having a throat and gate,
   a first pressure cylinder mounted on the other end of said base and having a first piston and first piston rod directed toward and in line with said throat,
   a movable carriage attached to the end of said first piston rod,
   a second pressure cylinder mounted on said carriage and having a second piston and second piston rod,
   a jaw attached to the end of said second piston rod,
   a stationary thrust support mounted on said carriage ahead of said jaw and designed so that a casing end fed from said throat may be wound around it for gripping by said jaw, and
   pressure leads, outlets and switches connected to said cylinders and arranged in a manner such that when a casing end is drawn through said throat and wound on said support and said gate is closed to actuate a pressure switch, said second piston rod is pushed against a casing end and support to clamp same firmly, and said first piston rod is pulled, whereby a clamped casing is drawn through said throat so that contents thereof are packed tightly before a fastener effects sealing of a casing end, and pressure is relieved after such sealing.

2. A casing pressure packer and sealer designed to pack a filled casing and seal same with a fastener driven over a throat through which a casing end is drawn, said throat having an end closure gate, comprising, a base, a casing sealing machine mounted on one end of said base, said machine having a throat and gate, a first pressure cylinder mounted on the other end of said base and having a first piston and first piston rod directed toward and in line with said throat, a movable carriage attached to the end of said first piston rod, a second pressure cylinder mounted on said carriage and having a second piston and second piston rod, a jaw attached to the end of said second piston rod, a stationary thrust support mounted on said carriage ahead of said jaw and designed so that a casing end fed from said throat may be wound around it for gripping by said jaw, and pressure leads, outlets and switches connected to said cylinders and arranged in a manner such that when a casing end is drawn through said throat and wound on said support and said gate is closed to actuate a pressure switch, said second piston rod is pushed against a casing end and support to clamp same firmly, and said first piston rod is pulled, whereby a clamped casing is drawn through said throat so that contents thereof are packed tightly before a fastener effects sealing of a casing end, and pressure is relieved after such sealing.

3. A casing pressure packer and sealer designed to pack a filled casing and seal same with a fastener driven over a throat through which a casing end is drawn, said throat having an end closure gate, comprising, a base, a casing sealing machine mounted on one end of said base, said machine having a throat and lockable gate, a first pressure cylinder mounted on the other end of said base and having a first piston and a first piston rod directed toward and in line with said throat, a movable carriage attached to the end of said first piston rod, a second pressure cylinder mounted on said carriage and having a second piston and second piston rod, a jaw attached to the end of said second piston rod, a stationary post mounted on said carriage ahead of said jaw and designed so that a casing end fed from said throat may be wound around it for gripping by said jaw, and pressure leads, outlets and switches connected to said cylinders and arranged in a manner such that when a casing end is drawn through said throat and wound on said post and said gate is locked to actuate a pressure switch, said second piston rod is pushed against a casing end and post to clamp same firmly, and said first piston rod is pulled, whereby a clamped casing end is drawn through said throat so that contents thereof are packed tightly before a fastener effects sealing of a casing end, and pressure is relieved after such sealing.

4. A casing pressure packer and sealer designed to pack a filled casing and seal same with a staple fastener driven over a throat through which a casing end is drawn, said throat having an end closure gate, comprising, a base, a casing stapling machine mounted on one end of said base in rearwardly-tilted relation thereto, said machine having a throat and lockable gate actuating a pressure switch when closed and locked, a first pressure cylinder mounted on the other end of said base and having a first piston and first piston rod directed toward and in line with said throat, a movable carriage attached to the end of said first piston rod, a guide rod mounted between the ends of said base and serving as supporting and guiding means for said carriage, a second pressure cylinder mounted on said carriage and having a second piston and second piston rod directed toward said throat, a jaw attached to the end of said second piston rod, a stationary post mounted on said carriage ahead of said jaw and designed so that a casing end fed from said throat may be wound around it for gripping by said jaw, and pressure leads, outlets and swtiches connected to said cylinders and arranged in a manner such that when a casing end is drawn through said throat and wound on said post and said gate is locked to actuate said pressure switch, said second piston rod is pushed against a casing end and post to clamp same firmly, and said first piston rod is pulled, whereby a clamped casing end is drawn through said throat so that contents thereof are packed tightly before a staple effects sealing of a casing end, and pressure is relieved after such sealing.

References Cited in the file of this patent

UNITED STATES PATENTS

| | | |
|---|---|---|
| 2,677,487 | Friedman | May 4, 1954 |
| 2,718,991 | Rabinowitz | Sept. 27, 1955 |
| 2,884,749 | Palmer et al. | May 5, 1959 |
| 2,899,785 | Gebhardt | Aug. 18, 1959 |